Feb. 8, 1938.  E. QUINN  2,107,502
INSEAM TRIMMING MACHINE
Filed April 30, 1936
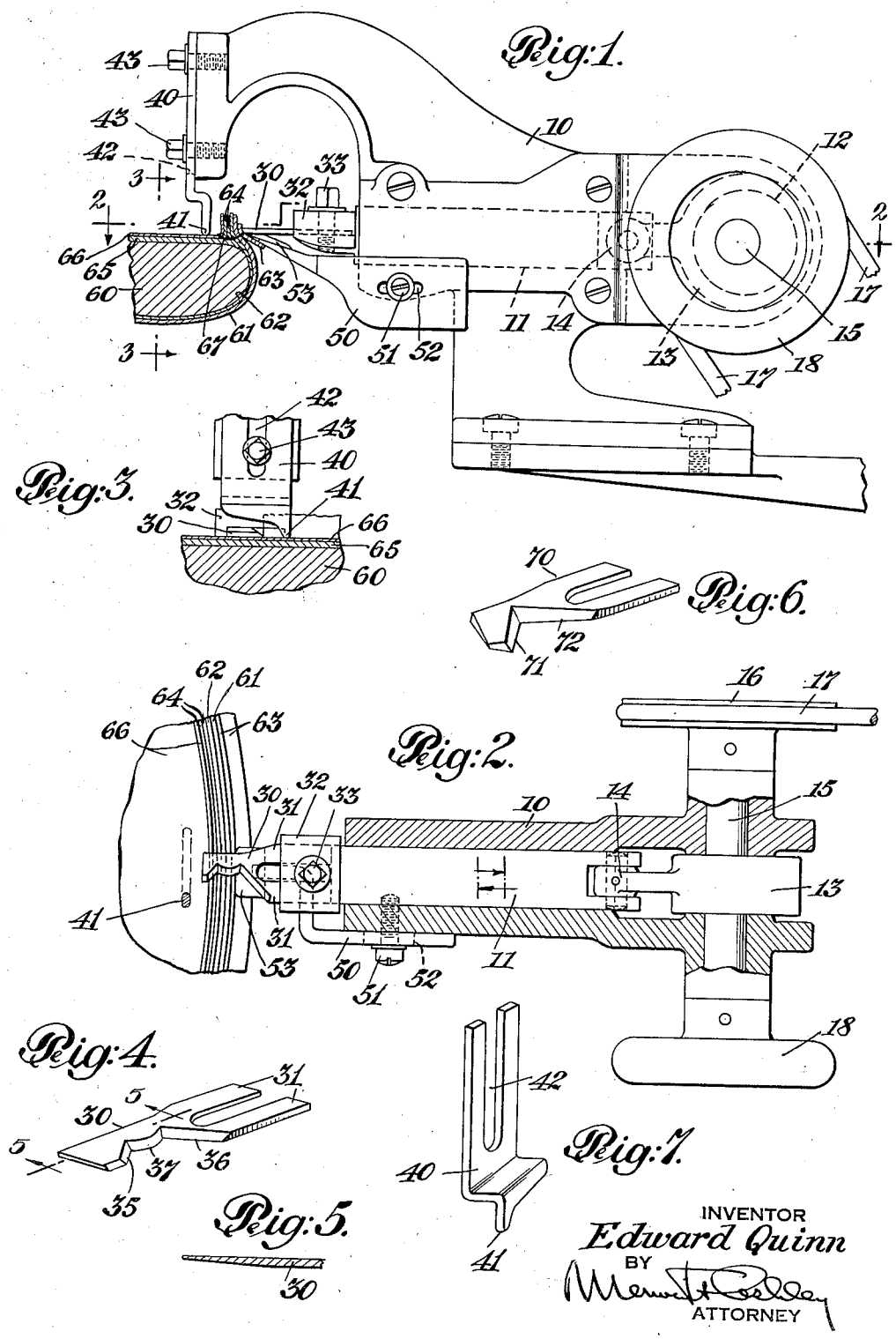
INVENTOR
Edward Quinn
BY
ATTORNEY Patented Feb. 8, 1938

2,107,502

UNITED STATES PATENT OFFICE 2,107,502

INSEAM TRIMMING MACHINE

Edward Quinn, Brooklyn, N. Y., assignor to The Del-Mac Shoe Process Corporation, New York, N. Y.

Application April 30, 1936, Serial No. 77,105

4 Claims. (Cl. 12—82)

My invention relates to inseam trimming machines of the type which embody a high speed reciprocating cutter. A principal object of my invention is to provide a machine of this character having an improved cutting blade or knife adapted to execute a diagonal drawing cut in both directions of its reciprocation and which will afford an effective cutting edge substantially greater in length than the distance of its reciprocating movement.

Another object of my invention is to provide in a machine of this character a free ended cutter blade having its cutting edge beveled on only one face so formed and proportioned that it will effect a cut of even depth under all conditions and will not gouge into the work.

A further object is to provide a trimming machine having improved adjustable cutting and work guiding means so relatively arranged that the machine may be universally employed for trimming away surplus materials projecting from the inseams of welted or turned shoes or from the bottom surface of insoles of cemented shoes. Other and further objects will appear from the following specification.

Referring to the drawing which forms a part of this specification:

Figure 1 is a side elevation in which the front of the machine is at the left.

Figure 2 is a cross sectional view taken on line 2—2 of Figure 1.

Figure 3 is a cross sectional view taken on line 3—3 of Figure 1.

Figure 4 is a perspective view of the cutting knife preferably employed for trimming the inseams of welt shoes.

Figure 5 is a longitudinal section thru the cutting knife taken on line 5—5 of Figure 4, and illustrates the tapered form of the blade.

Figure 6 is a perspective view of a modified form of cutter blade well suited for certain classes of work, and Figure 7 is a perspective view of the outer work guide member.

The general organization of the power transmitting and supporting parts of the machine are well-known and form no part of the present invention. Such parts comprise a frame 10 provided with a guideway in which a cutter slide 11 is reciprocated by an eccentric 12 to which the slide is connected by an eccentric strap 13, the pivot pin 14 forming the connection between the slide and the strap. The eccentric 12 is carried by a shaft 15 journalled in bearings in the frame 10 and is provided with a receiving pulley 16 for a driving belt 17. A hand wheel 18 is mounted on the other end of shaft 15, as shown.

The features of improvement comprise a cutter knife 30, having its shank portion bifurcated to define arms 31—31, adjustably mounted on the slide 11 by means of a clamp 32 and bolt 33 which passes thru the clamp and between the arms 31 into the slide. So mounted the knife may be readily adjusted lengthwise of the slide and may be quickly and easily removed for sharpening or replacement. The knife blade 30 is reduced in width on both sides at its outer end and is recessed or notched to provide cutting edge portions extending at divergent angles to each other and obliquely with respect to the path in which the blade is reciprocated by the slide 11. The cutting area of the blade is tapered on its underside, as best shown in Figure 5, and the upper face of the cutting portion is beveled (Fig. 4) to form sharp cutting edges 35, 36 and 37 on the lower face of the blade.

To properly present and guide the shoe in relation to the cutter, I have provided an adjustable outer guide 40 and an adjustable inner guide or abutment 50, which latter guide also serves effectually as a guard for protecting the inseam stitches of sewn shoes. The outer guide is best illustrated in Figure 3 and comprises an abutment 41 rounded to afford a minimum of resistance to work moved against it and is positioned for engagement by the work outwardly of the cutter and slightly in advance of the plane in which the cutter operates. The outer guide is secured for vertical adjustment to the main frame 10 by bolts 43—43 passing thru the slotted portion 42 of the guide.

The inner guide and stitch guard 50 is secured to the main frame by a bolt 51 passing thru slot 52 and extends forwardly and upwardly, terminating in a flat shaped portion 53 just below the cutter blade 30. So formed and positioned this guard is well adapted for sliding engagement by the welt of a lasted shoe and may be adjusted both vertically and horizontally in relation to the work by loosening the bolt 51.

Fitted as above described the machine is well suited for trimming the inseams of welt shoes such as illustrated in Figures 1-3 in which 60 indicates a last having an upper 61, lining 62 and welt 63 assembled thereon to the lipped portions 64—64 of an insole 65 and its fabric reinforcing layer 66, the assembly being secured by inseam stitching 67.

In preparing to trim the inseams of shoes of the type described, the inner and outer guides are adjusted relative to each other and to the plane of operation of the blade 30 to position the work in proper relation to the blade, depending upon the closeness with which it is desired to trim. As the work is moved in engagement with the reciprocating blade, it progresses smoothly in contact with the opposed guides against which it is firmly held to insure a level severance of the surplus materials. As shown, the broad end 53 of the inner guide abuts the between substance of a welted shoe at or just above the stitching so that the stitches are protected and cannot be engaged by the knife.

The light blade 30 accomplishes a clean, level drawing cut between the guides 40 and 50. Heretofore blades beveled only on one side have shown a marked tendency to draw the work in the direction of the bevel or, conversely, for the blade by reason of its bevel to be drawn out of its normal plane of operation by the resistance of the work. In other words, where the upper face of the blade is beveled to form an edge on the lower face, as in the present case, the blade, if flexible, tends to gouge too deeply into the work, whereas if the blade is rigid, the work is drawn upwardly with the same unsatisfactory result, imperilling the stitches if not actually cutting them. Inasmuch as this tendency is inherent where the bezel of the cutting edge is formed on only one face of the blade, and since it is undesirable to bevel the cutter on both faces for this type of work, I have compensated for the undesirable tendencies by tapering the blade on its underside as illustrated in Figure 5. So tapered the blade would not effect a flat cut in its normal position but, being somewhat flexible, in operation its free end is immediately drawn down into the work and the blade maintains a substantially horizontal under surface during its severing operations, obtaining a level cut.

The divergent blade sections 35 and 36 of the cutter 30 engage the work in advance of the curved intermediate section 37, the inner section 36 operating to cleave thru the welt and contiguous layers, whereas the outer section 35 severs the reinforcement 63 and the layers or plies contiguous thereto from the inner side of the seam. The intermediate curved section 37 remains in the work at all times during the trimming operation, overlaps the diagonal cuts of the sections 35 and 36, and may sever initially any central plies of the upstanding material left uncut by the other blade sections, this depending on the distance which the blade reciprocates and the width of the combined plies to be trimmed.

From the foregoing it will be understood that all the cutting edges lie in a plane normally inclined to their path of reciprocation, but because the blade is flexible at the deepest part of the cutting notch the plane of the cutting edges is brought into parallelism with the path of travel by the deflecting of camming action of the bevels on the upper face of the blade. The relief afforded by the taper on the bottom of the blade permits downward deflection by the bevel of the edge 36 during the forward stroke and similar deflection by the bevel of the edge 35 during the back stroke.

I have found that a blade so constructed obtains a very clean, smooth and even cut, leaving the trimmed edges of the upstanding materials all in the same plane. I attribute my success with this blade in part to the oblique drawing cut which its angular edge sections obtain and, in part, to the fact that by reason of its form the cut is made at a higher effective speed than would be possible with a straight edged blade, and the effective length of the cutting edge is substantially greater than the distance of blade reciprocation. In other words, the combined length of the cutting edge sections 35, 36 and 37 is about double the distance taken from the outer end of section 35 to the inner end of section 36. Correspondingly, since a longer effective cutting edge passes thru the work on a single reciprocation than would be possible with a straight edged knife, the cutting edge passes thru the material at a higher than normal speed.

The modified blade 70 shown in Figure 6 is reduced in width at its free end and is tapered on its lower face similarly as is the blade 30. In this modification, however, the recessed or notched portion is V-shaped and sharpened to provide two divergent cutting edge sections 71 and 72, the paths of which overlap each other in the work. This knife operates to obtain the oblique drawing cuts and greater effective cutting length and speed in the same manner as does the blade 30 and is well suited for most trimming operations. However, where the combined plies of upstanding surplus material form a wide rib, as in welt shoes, I prefer to employ the blade 30.

Having thus described my invention, I claim:

1. A trimming machine of the character described comprising a trimming blade arranged to operate on the bottom of a lasted shoe to trim surplus material therefrom, mechanism for imparting reciprocatory motion to said blade, said blade having a free end and a plurality of sharp cutting edge sections on one side thereof extending at divergent angles to each other and obliquely to the path of reciprocation, the bezel of said cutting edge sections being on one face of the blade and the other face of the blade being tapered to its free end, means arranged to engage the shoe bottom adjacent to the trimming locality to control the closeness of trimming, and an abutment arranged to guide the shoe by engagement with the material being trimmed.

2. In a machine of the character described, a trimming blade, mechanism for imparting reciprocatory motion to the blade, said blade having a free end and a plurality of cutting edge sections on one side thereof extending at divergent angles to each other and obliquely to the path of reciprocation, the bezel of said edge sections being on one face of the blade and the other face of the blade being tapered to its free end.

3. A trimming machine of the character described comprising a trimming blade arranged to operate on the bottom of a lasted shoe to trim surplus material therefrom, mechanism for imparting reciprocatory motion to the blade, said blade having a free end and a sharp side edge, one surface of the blade being tapered to its free end and said sharp side edge being coincident with said tapered surface, means arranged to engage the shoe bottom adjacent to the trimming locality to control the closeness of trimming, and an abutment arranged to guide the shoe by engagement with the material being trimmed.

4. A trimming machine comprising a cutting blade and mechanism by which it is reciprocated edgewise with short strokes, one margin of said blade extending lengthwise of its path of reciprocation having a notch bounded by two oppositely oblique cutting edges arranged to cut alternately into opposite faces of work fed between them, said blade also having a curved cutting edge portion connecting the inner ends of said oblique edges and projecting into said notch.

EDWARD QUINN.